US009651098B2

(12) United States Patent
Bregler (10) Patent No.: US 9,651,098 B2
(45) Date of Patent: May 16, 2017

(54) HYDRODYNAMIC MACHINE, IN PARTICULAR HYDRODYNAMIC COUPLING

(71) Applicant: Voith Patent GmbH, Heidenheim (DE)

(72) Inventor: Haymo Bregler, Fichtenau (DE)

(73) Assignee: Voith Patent GmbH, Heidenheim (DE)

( * ) Notice: Subject to any disclaimer, the term of this patent is extended or adjusted under 35 U.S.C. 154(b) by 61 days.

(21) Appl. No.: 14/882,894

(22) Filed: Oct. 14, 2015

(65) Prior Publication Data
US 2016/0069399 A1    Mar. 10, 2016

Related U.S. Application Data

(63) Continuation of application No. PCT/EP2014/050776, filed on Jan. 16, 2014.

(30) Foreign Application Priority Data

May 3, 2013   (DE) .......................... 10 2013 007 544

(51) Int. Cl.
*F16D 33/00*  (2006.01)
*F16D 33/20*  (2006.01)
(Continued)

(52) U.S. Cl.
CPC .............. *F16D 33/20* (2013.01); *F16C 33/10* (2013.01); *F16D 33/00* (2013.01); *F16D 33/18* (2013.01);
(Continued)

(58) Field of Classification Search
CPC ..................................................... F16H 41/30
(Continued)

(56) References Cited

U.S. PATENT DOCUMENTS

| 4,534,456 A * | 8/1985 | Slezak ................... F16H 41/30 |
|---|---|---|
| | | 60/339 |
| 6,725,657 B1 | 4/2004 | Kimura et al. |
| 7,343,739 B2 * | 3/2008 | Hein ....................... F16D 33/16 |
| | | 60/339 |

FOREIGN PATENT DOCUMENTS

| DE | 101 20 477 A1 | 11/2002 |
|---|---|---|
| DE | 103 27 133 A1 | 1/2005 |
| WO | 2004/111482 A1 | 12/2004 |

OTHER PUBLICATIONS

Communication Via the Transmission of the International Search Report and the Written Opinion of the International Searching Authority or the Policy dated Apr. 17, 2014 for International Application No. PCT/EP2014/050776 (10 pages).

* cited by examiner

*Primary Examiner* — Michael Leslie
(74) *Attorney, Agent, or Firm* — Taylor IP, P.C.

(57) ABSTRACT

The invention relates to a hydrodynamic machine, in particular a hydrodynamic coupling, having a bladed primary wheel and a stationary or revolving bladed secondary wheel, forming a working chamber in order to transmit torque hydrodynamically. The primary wheel and/or the secondary wheel is rotatably mounted by means of at least one plain bearing, which is lubricated by a lubricant source connected by way of at least one lubricant supply line, and a lubricant outlet which is connected by way of a lubricant discharge line, such that in the lubricant supply line and/or the lubricant discharge line a lubricant reservoir, connected to the at least one plain bearing by means of at least one lubricant feed conduit and at least one lubricant return conduit and therefor forming a lubricant circuit, is provided in the event of a failure of the lubricant supply from the lubricant source.

20 Claims, 5 Drawing Sheets

(51) Int. Cl.
*F16H 41/30* (2006.01)
*F16D 33/18* (2006.01)
*F16C 33/10* (2006.01)

(52) U.S. Cl.
CPC ..... *F16H 41/30* (2013.01); *F16D 2300/0214* (2013.01); *F16D 2300/06* (2013.01)

(58) Field of Classification Search
USPC .......................................................... 60/339
See application file for complete search history.

HYDRODYNAMIC MACHINE, IN PARTICULAR HYDRODYNAMIC COUPLING

CROSS REFERENCE TO RELATED APPLICATIONS

This is a continuation of PCT application No. PCT/EP2014/050776, entitled "HYDRODYNAMIC MACHINE, IN PARTICULAR HYDRODYNAMIC COUPLING", filed Jan. 16, 2014, which is incorporated herein by reference.

BACKGROUND OF THE INVENTION

1. Field of the Invention

The current invention relates to a hydrodynamic machine, in particular a hydrodynamic coupling.

2. Description of the Related Art

Hydrodynamic couplings that are equipped with a revolving bladed primary wheel and a stationary or also revolving bladed secondary wheel—referred to as impeller and turbine wheel in the case of a hydrodynamic coupling, and referred to as rotor and stator or rotor and counter-rotation rotor in the case of a hydrodynamic retarder—conventionally include antifriction bearings for mounting the revolving components. However, hydrodynamic couplings have already been suggested that have plain bearings, lubricated with the working medium. See for example DE 101 20 477 B4 and EP 1 633 991 B1.

DE 101 20 477 B4 moreover suggests to design the combined thrust and radial bearings as plain bearings in a hydrodynamic coupling, whereby the working medium is used as the lubricant and the supply to the bearings occurs from the working medium supply of the clutch.

In the case of hydrodynamic couplings having plain bearings that are lubricated with working medium it cannot be reliably ruled out that the lubricant supply to the bearings is not interrupted or considerably reduced in certain operational conditions. European patent specification EP 1 633 991 B1 specifically points out that a supply to the bearings occurs only when a certain pressure in the system is reached, in order to achieve a more rapid filling of the working chamber of the hydrodynamic coupling with working medium. Moreover it is possible with known couplings that, for example, the drive shaft is rotated in towing operation before the lubricant supply of the bearing is activated, so that there is a risk of damaging the bearings.

Finally, the lubricant supply can intermittently fail, resulting in the bearings running dry.

The aforementioned issue could conventionally only be solved in that relatively expensive plain bearings were used that permitted a temporary dry run. However, this resulted in undesirable high production costs of the hydrodynamic coupling.

SUMMARY OF THE INVENTION

The current invention specifies a hydrodynamic machine, in particular a hydrodynamic coupling which reliably prevents dry running or respectively dry operation of the plain bearings.

An inventive hydrodynamic machine, in particular a hydrodynamic coupling includes a bladed primary wheel revolving about the axis of rotation of the hydrodynamic machine and a bladed secondary wheel which is stationary or which also revolves about the axis of rotation. The primary and secondary wheels together form a toroidal chamber that is filled or can be filled with a working medium, in order to transmit torque hydro-dynamically via a working medium circuit inside the working chamber from the primary wheel to the secondary wheel in order to thereby either hydro-dynamically drive the secondary wheel in the case of a driven primary wheel (in the case of a hydrodynamic coupling) or in the case of a hydrodynamic retarder to brake the primary wheel. The current invention can be used not only with hydrodynamic couplings and hydrodynamic retarders, but also with hydrodynamic converters which, in addition to the primary wheel and secondary wheel, have at least one guide wheel in the working chamber in order to enable a torque conversion.

The primary wheel and/or the secondary wheel are rotatably mounted by way of at least one plain bearing. The secondary wheel is for example mounted by way of at least one thrust bearing, in particular with a so-called thrust ring and by way of one or several radial bearing, whereby the specified bearings are in the embodiment of plain bearings. A corresponding mounting is also considered for the primary wheel. This can also be externally mounted, for example, on the drive shaft of a drive motor. Instead of the primary wheel, the secondary wheel could be externally mounted and the inventive plain bearing mount could be provided only for the primary wheel.

A lubricant supply system is provided for the supply of lubricant to the at least one plain bearing of the hydrodynamic machine, including a lubricant source that is connected via at least one lubricant supply line with the plain bearing, and having a lubricant outlet that is connected via a lubricant discharge line with the at least one plain bearing. It is thus possible to supply the at least one plain bearing with lubricant from the lubricant source via the lubricant supply line and to discharge this lubricant from the plain bearing via the lubricant discharge line, in particular to remove the frictional heat from the lubricant that was absorbed in the plain bearing. The removal can occur through a heat exchanger, at least indirectly back into the lubricant source, or in an open circuit to another location.

According to the invention a lubricant reservoir is provided in the lubricant supply line and/or in the lubricant discharge line which, for formation of a lubricant circuit between the lubricant reservoir and the at least one plain bearing, is connected via the at least one lubricant feed conduit and the at least one lubricant return conduit with the at least one plain bearing in the event of a failure of the lubricant supply from the lubricant source. During a failure of the lubricant supply from the lubricant source, a lubricant supply from the lubricant reservoir into the at least one plain bearing and a lubricant discharge from the at least one plain bearing back into the lubricant reservoir can still occur, thus maintaining a lubricant circuit for removal of the heat from the plain bearing. The lubricant reservoir can, appropriately dimensioned, be equipped with cooling ribs and/or can be cooled otherwise, so that sufficient heat removal from the lubricant and thus cooling of the pain bearing is possible at least over a certain time period.

It is moreover possible to deliver the hydrodynamic machine with a lubricant reservoir that is already filled with lubricant, so that in the event the primary wheel and/or the secondary wheel are rotated before the hydrodynamic machine is connected to the lubricant source, or before the lubricant supply system is put into operation, running dry or respectively dry operation of the at least one plain bearing is prevented through the aforementioned "small" lubricant circuit from the lubricant reservoir via the feed conduit into the plain bearing and via the return conduit back into the lubricant reservoir.

At the time of shipment the lubricant reservoir of the hydrodynamic machine may for example be filled with lubricant to a level of 50 percent to 90 percent, in particular 75 to 85 percent and particularly advantageously to 80 percent.

Preferred lubricants are water or a water mixture. However other lubricants are also possible, for example oils, such as a mineral oil or silicone oil or others.

Another embodiment provides that the lubricant reservoir contains at least four lubricant connections: a first lubricant connection that is connected with the lubricant source and through which therefore lubricant can be fed from the lubricant source into the lubricant reservoir, a second lubricant connection that is connected with the lubricant outlet so that lubricant can be routed from the lubricant reservoir into the working chamber of the hydrodynamic machine for another use or for disposal, a third lubricant connection that is connected with the lubricant feed conduit so that lubricant can be fed from the lubricant reservoir to the at least one plain bearing, and a fourth lubricant connection that is connected with the lubricant return conduit so that lubricant can be routed from the at least one plain bearing back into the lubricant reservoir in order to form the aforementioned "small" lubricant circuit.

In another embodiment, a shut-off valve and/or a switching valve is provided in the lubricant supply line, whereby such a switching valve can have at least three connections. Through the first connection it is connected with the lubrication source, via the second connection it is connected with the lubricant reservoir, and via the third connection it is connected with the at least one plain bearing. The switching valve has at least two switching positions: a first switching position in which at least or exclusively the lubricant source is connected—lubricant conducting—with the at least one plain bearing, whereby the lubricant reservoir is detached; and a second switching position wherein the lubricant reservoir is connected—lubricant conducting—with the at least one plain bearing and whereby the lubricant source is detached.

The switching valve can be designed as an active valve with an actuator in order to actively switch the switching positions, subject to a supplied control signal. The actuator can for example have an electric, electromagnetic, hydraulic or pneumatic actuation. Alternatively it is also possible to design the switching valve as a passive valve that switches subject to the existing lubricant pressures in the connections. It can for example automatically shut off the connection of the lubricant source if a pressure drop occurs there or respectively if a comparatively low pressure exists, and at the same time open or keep open the connection of the lubricant reservoir in order to open the connection of the lubricant source if a comparatively higher pressure exists there, and shut the connection of the lubricant reservoir at the same time.

According to another embodiment, the switching valve and/or a shut-off valve can remain continuously open as long as lubricant from the lubricant source is available in the lubricant supply line. An alternative embodiment provides that the valve is synchronized for filling or cooling of the working chamber of the hydrodynamic machine or that timed switching is provided. This function can also be fulfilled by only a shut-off valve in the lubricant supply line.

Several orifices can be provided in the lubricant feed conduit and/or in the lubricant return conduit in order to achieve a predetermined dynamic pressure in the plain bearing.

In another embodiment, the lubricant reservoir is already filled at the time of delivery and providing a bursting disk, in particular a first bursting disk in the first lubricant connection which is destructible by supplying the first lubricant connection with lubricant from the lubricant supply line. Therefore, as soon as the lubricant source is connected to the lubricant supply line and lubricant flows from the lubricant source at a predetermined pressure into the lubricant supply line, the bursting disk destructs automatically and the supply of lubricant into the lubricant reservoir is thus achieved.

In yet another embodiment, a second bursting disk can be provided in the second lubricant connection that is destructible by lubricant flowing via the first lubricant connection into the lubricant reservoir. Therefore, as soon as a sufficient lubricant pressure is achieved by further filling of the lubricant reservoir from the lubricant source, automatic destruction of the bursting disk in the second lubricant connection occurs and the flow connection is thereby established to the lubricant discharge line.

In another embodiment, the lubricant reservoir is in the shape of a cylinder or hollow cylinder and the lubricant connections are distributed over the circumference of this cylinder or respectively hollow cylinder. The axis of the cylinder or respectively hollow cylinder coincides with the rotational axis of the hydrodynamic machine. The lubricant reservoir can thus be connected on the face of the hydrodynamic machine, detachably or non-detachably, for example through welding.

It is also possible that the axis of the cylinder or hollow cylinder is positioned eccentrically to the rotational axis of the hydrodynamic machine or progresses at an angle to same. It is also possible to provide another shape of the lubricant reservoir, extending over the circumference of the rotational axis (centrically or eccentrically)—for example a rectangular shape, the shape of a polyhedron, a cone shape or others.

The first lubricant connection and the second lubricant connection can be provided one after another in circumferential direction of the cylinder or hollow cylinder with a partition, for example a partition plate arranged between them, thus achieving a nearly 360 degree flow through the lubricant reservoir occurs from the first lubricant connection to the second lubricant connection.

If the working medium of the hydrodynamic machine is at the same time the lubricant for the at least one plain bearing, an embodiment provides that the entire working medium volume that is supplied to the working chamber of the hydrodynamic machine flows through the lubricant reservoir before it enters the working chamber. Another embodiment provides that only a part of the working medium stream flows into the working chamber through the lubricant reservoir. In each case it is advantageous if the working medium volume/lubricant volume that flows through the lubricant reservoir from the first lubricant connection to the second lubricant connection is rated such that dirt deposits are prevented and sufficient cooling of the lubricant reservoir occurs.

The first lubricant connection and the second lubricant connection may be positioned above the third lubricant connection and the fourth lubricant connection in the lubricant reservoir. The fourth lubricant connection may be located above the third lubricant connection in the lubricant reservoir. Other positioning are also possible, whereby it is ensured that the entire lubricant reservoir is flushed through.

It is also possible that several working medium supplies, first lubricant connections and/or second lubricant connections are provided.

Another embodiment according to the invention provides that a multitude of third lubricant connections and/or fourth lubricant connections are provided in the lubricant reservoir. Thus, several feed conduits and/or return conduits that are arranged parallel relative to the lubricant flow can be connected to the lubricant reservoir.

In another embodiment, a multitude of plain bearings are provided, whereby various plain bearings or all plain bearings are supplied in series by lubricant. A parallel flow through one or several individual groups of plain bearings or of all bearings is also possible.

At least one plain bearing is designed as a thrust plain bearing and at least one plain bearing as a radial plain bearing, and the lubricant is fed from the lubricant source and/or the lubricant reservoir in particular first to the at least one radial plain bearing and subsequently to the thrust plain bearing, or vice versa.

If several thrust plain bearings and/or several radial plain bearings are provided, lubricant can advantageously flow parallel relative to each other through the thrust plain bearings and the radial plain bearings respectively, whereby the radial plain bearings are connected in series to the thrust plain bearings in regard to the lubricant flow.

The lubricant reservoir is sealed pressure-tight to protect against the environment, as are all plain bearings that are lubricated by means of the lubricant from the lubricant supply system. The plain bearings can be sealed to protect against the environment by way of shaft seals, for example PTEE-double seals.

According to another embodiment of the invention, the "small" lubricant circuit between the lubricant reservoir and the at least one plain bearing is maintained or respectively created by only the pumping effect of the at least one plain bearing. The thrust ring of the thrust plain bearing can produce a differential pressure, so that suction is created on the side of the radial plain bearing facing the thrust ring, whereby said bearing is positioned beside the thrust ring and has lubricant flowing through it before the thrust plain bearing. The lubricant is then transported back from the thrust ring through centrifugal force, via the at least one return conduit into the lubricant reservoir.

The one or several radial plain bearings can be designed as multi-surface radial plain bearings, in particular as four-surface radial plain bearings. The thrust bearing/bearings can also have a multitude of bearing segments which are advantageously tiltably mounted.

Another embodiment provides that parallel to the return conduit a vent line is provided that connects the at least one plain bearing, in particular the thrust bearing, with the interior of the lubricant reservoir.

The at least one feed conduit or the multitude of feed conduits and/or the at least one return conduit or the multitude of return conduits can progress at an angle relative to a vertical and a horizontal, in particular offset at an angle thereto by approximately 40 to 50 degrees.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
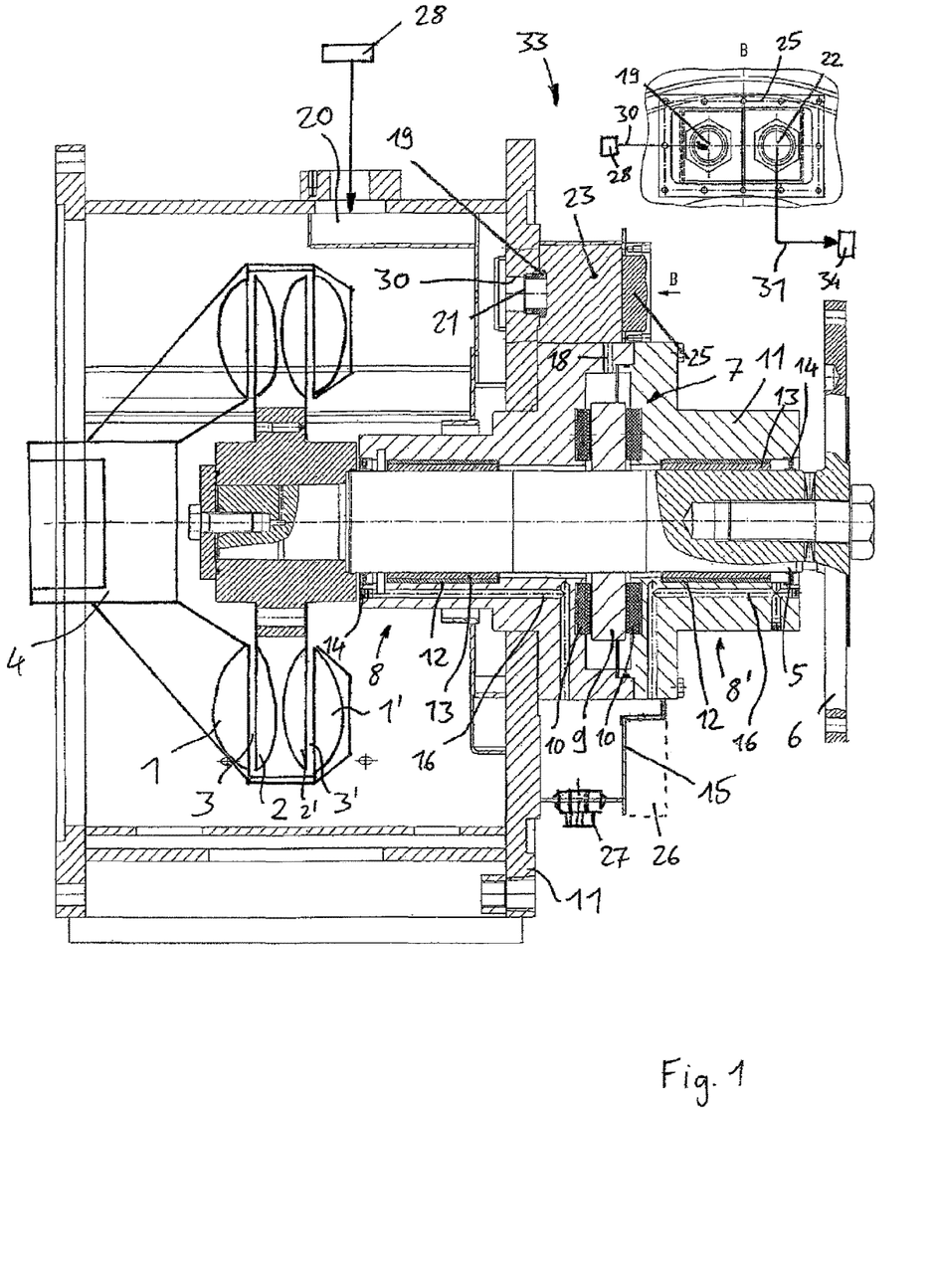
FIG. 1 is a schematic sectional illustration through an axial section of a hydrodynamic coupling according to the invention.

FIG. 1 illustrates a schematic axial section through a hydrodynamic machine that is in the embodiment of a hydrodynamic coupling. Accordingly the hydrodynamic coupling includes a revolving bladed primary wheel 1 and a revolving bladed secondary wheel 2 which together form a working chamber 3. The hydrodynamic machine in this embodiment is designed as a double flow machine. This means that it forms two working chambers 3, 3' which are formed between two primary wheels 1, 1' and two secondary wheels 2, 2', whereby primary wheels 1, 1' are connected to one another torsionally rigid and secondary wheels 2, 2' are connected to one another torsionally rigid, for example in the illustrated back-to-back arrangement. A single flow machine could also be used or, in order to represent a hydrodynamic retarder, the secondary wheel could remain stationary or could be driven in opposite direction to the primary wheel.

A drive shaft 4 is provided for driving primary wheel 1. This can include a drive opening and can be mounted outside the hydrodynamic machine together with primary wheel/wheels 1, 1', for example on the drive shaft of a drive motor (not illustrated).

Secondary wheel or wheels 2, 2' is/are supported by a drive shaft 5 which is equipped with a drive flange 6.

As illustrated, only drive shaft 4 that carries secondary wheel/wheels 2, 2' is equipped with an inventive plain bearing, including a thrust plain bearing 7 and two radial plain bearings 8, 8'. Thrust plain bearing 7 includes a thrust ring 9 that works together with thrust bearing segments 10 that are positioned opposite one another on both sides of said thrust ring 9. Thrust bearing segments 10 are for example mounted tiltably by way of an attachment on the housing side—see the axial protrusions facing housing 11 of the hydrodynamic machine.

Thrust bearing segments 10 can for example be guided in housing 11 with a clearance fit and can be manufactured in comparison to thrust ring 9 from a comparatively soft material. Thrust ring 9 is fastened for example by way of a cylindrical compression connector on drive shaft 5.

Housing 11 also accommodates radial plain bearings 8, 8' which, in the illustrated example includes a bushing 12 that is inserted into the housing with a light pressure and into which radially inside a bearing material 13 is introduced, in that, compared to the material of bushing 12 is softer. Bushing 12 may for example be manufactured from steel or from another material that is harder compared to the material of bearing material 13. Alternatively, a material having the same hardness or a softer material can be used, or the entire bushing 12 can be manufactured from the bearing material.

Figure 4:
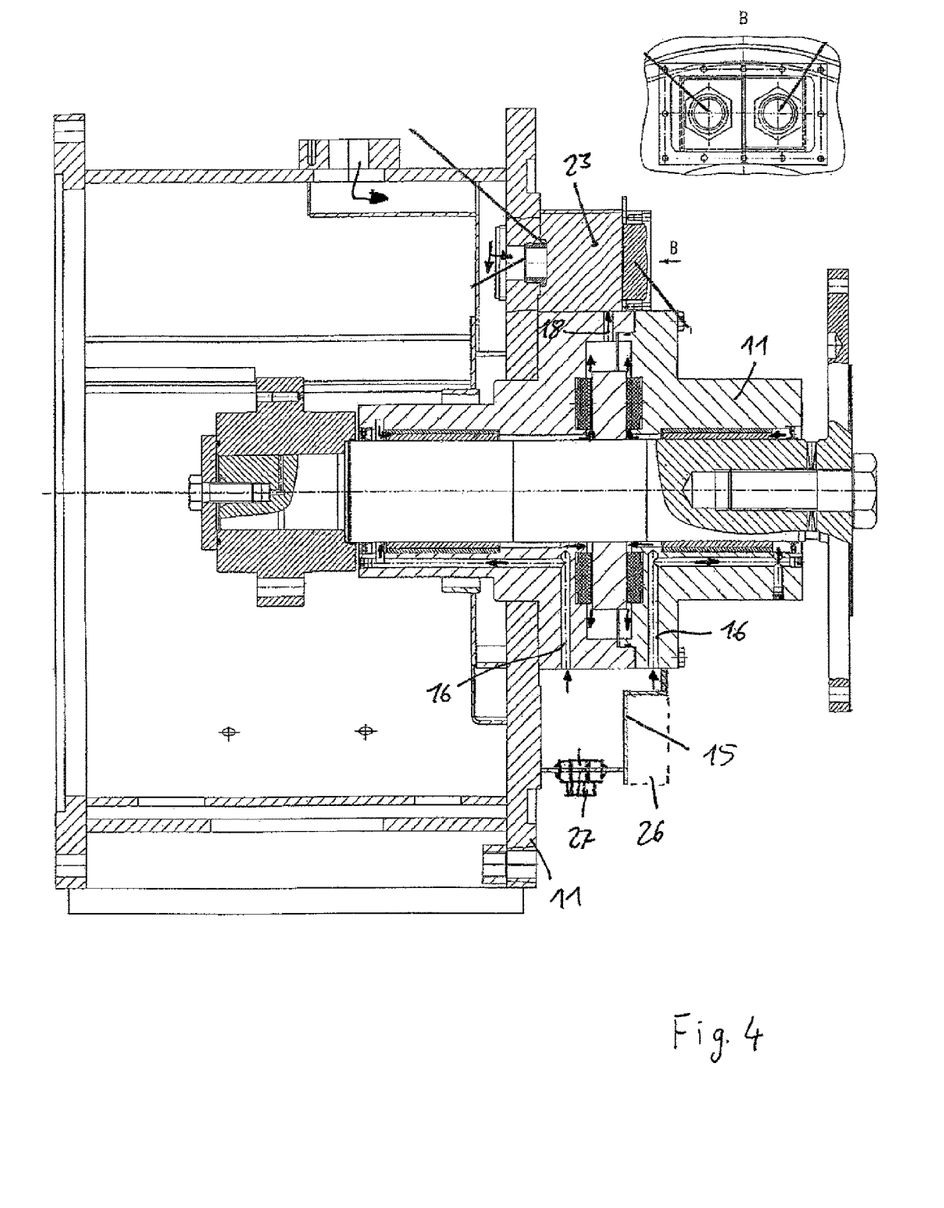
FIG. 4 is the schematic sectional view of FIG. 1 with the flow progression shown.

Radial plain bearings 8, 8' and axial plain bearing 7 are conductively connected with each other as shown in FIG. 4 by the flow progression of the lubricant that is indicated by the arrows and which is explained in further detail below.

Because the two radial plain bearings 8, 8' enclose axial plain bearing 7 between them, only one seal is necessary on the two outer ends of radial plain bearings 8, 8' that face away from one another. In the current example this seal is achieved by shaft seals 14 at the axial ends of drive shaft 5.

For the supply of lubricant to the plain bearings, a lubricant reservoir 15 is provided which is connected with the plain bearings via two lubricant feed conduits 16 that are arranged parallel to the lubricant flow and two parallel lubricant return conduits 17. See also FIG. 2. Lubricant feed conduits 16 supply lubricant from lubricant reservoir 15 to the axial outer ends of radial plain bearings 8, 8' from where the lubricant flows in axial direction inward through radial plain bearings 8, 8' to the radial inner end of axial plain bearing 7, and subsequently outward through axial plain bearing 7 and via lubricant return conduit 17 back into lubricant reservoir 15. This flow process, which herein is also referred to as a small lubricant circuit, is illustrated in FIGS. 3 and 4.

Viewed in the flow direction parallel to lubrication return conduits 17, a vent line 18 is provided that facilitates venting from axial bearing 7 into lubricant reservoir 15. See FIGS. 1 and 4.

Supply of lubricant reservoir 15—which at the time of delivery is already filled or partially filled with lubricant—occurs via first lubricant connection 19 that branches off from working medium supply 20 for working chamber 3, 3' of the hydrodynamic machine. At the time of shipment this first lubricant connection 19 is preferably sealed by a first bursting disk 21 that destructs when supplying pressure to working medium supply 20 with working medium that at the same time represents the lubricant.

Figure 3:
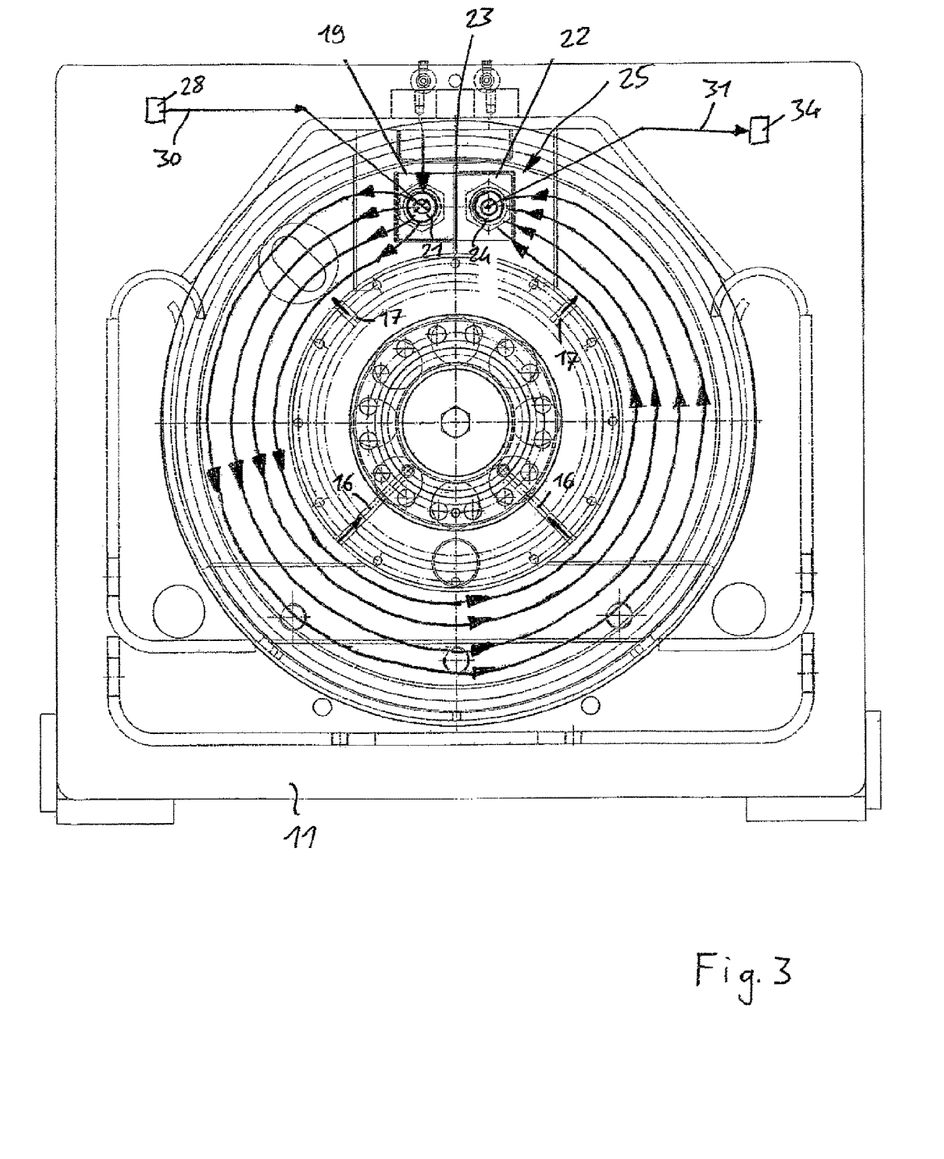
FIG. 3 is the view from FIG. 2 with the flow progression of the lubricant shown.

The lubricant flows from the first lubricant connection 19 in circumferential direction through almost the entire lubricant reservoir 15 to second lubricant connection 22 which—separated by a partition or a partition plate 23—is positioned immediately prior to first lubricant connection 19 in circumferential direction, viewed in the flow direction of the lubricant (see FIG. 3). Second lubricant connection 22 can also be sealed by a bursting disk 24 at the time of delivery of the hydrodynamic machine.

In order to keep bursting discs 21, 24 which are for example provided in clamping screws and are screwed into housing 11 accessible, lubricant reservoir 15 is equipped with a removable lid 25 which is located opposite first lubricant connection 19 and second lubricant connection 22 in the axial direction. This lid 25 is again illustrated in detail B in FIG. 1. It is connected to the remaining housing of lubricant reservoir 15 which, for example at the face on the housing part that surrounds the bladed wheels of the hydrodynamic machine.

In the illustrated example a part of the working medium, for example water, that flows into working chamber 3 via working medium feed 20 can be diverted through first lubricant connection 19 and can be routed through lubricant reservoir 15. The lubricant stream flowing out of second lubricant connection 22 can then be routed back into working medium feed 20 and from there into working chamber 3. Alternatively, the entire working medium stream is routed through lubricant reservoir 15, and only subsequently into working chamber 3. As a result, a comparatively high flow speed of the lubricant can be achieved in lubricant reservoir 15, thus preventing dirt deposits and facilitating effective cooling of the lubricant in lubricant reservoir 15, and at the same time defining a clear flow direction of the lubricant/working medium.

For better removal of heat from lubricant reservoir 15, cooling ribs 26 may be provided on the outside of the same as indicated by the broken line in FIGS. 3 and 4.

A drain plug 27 can be provided in the lower region of lubricant reservoir 15, in order to be able to drain the lubricant from same.

As illustrated, when the hydrodynamic machine is operated for the first time the dynamic pressure in working medium feed 20 at the branch-off to first lubricant connection 19 causes first bursting disk 21 and subsequently also second bursting disk 24 to burst. Lubricant reservoir 15 is flushed with "fresh" lubricant as long as the filling volume flow of working medium for the hydrodynamic machine is present in working medium feed 20. When this filling volume flow is interrupted or before start-up of the hydrodynamic machine and when drive shaft 5 simultaneously rotates—for example during towing operation—the lubricant supply to the plain bearings is ensured, since the pumping effect of the plain bearings themselves, in particular that of axial plain bearing 7, effects delivery of lubricant out of lubricant reservoir 15, through the plain bearings and back into lubricant reservoir 15. Axial plain bearing 7 is for example designed so that, based on the rotational movement of drive shaft 5 a centrifugal force acts upon the lubricant in axial plain bearing 7, thus moving it radially from the inside to the outside. This causes a vacuum radially inside axial plain bearing 7, that again takes in lubricant from the two radial plain bearings 8, 8'. Lubricant is simultaneously taken in via lubricant feed conduits 16, whereas the overpressure in the radial outer region of axial plain bearing 7 moves the lubricant back via lubricant return conduits 17 into lubricant reservoir 15.

Figure 2:
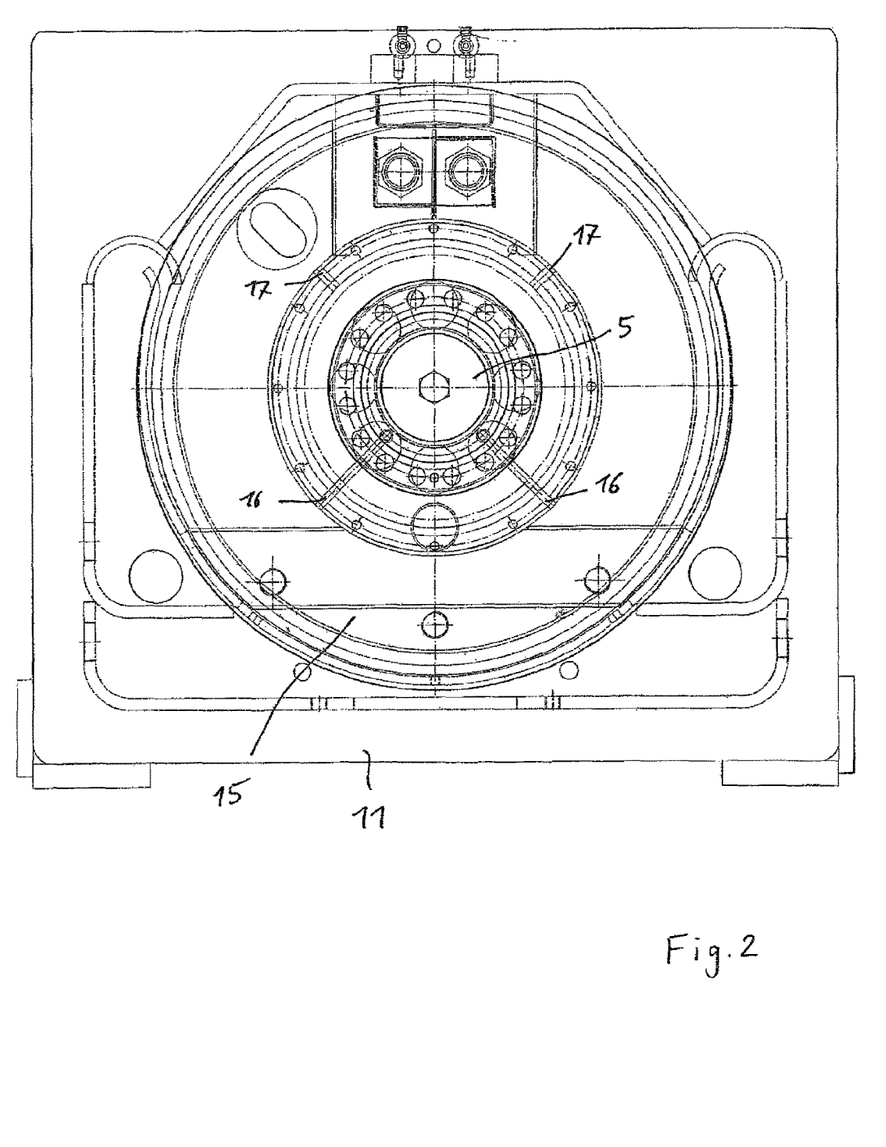
FIG. 2 is a view in the axial direction through the hydrodynamic coupling to FIG. 1.

The angular positioning illustrated in FIGS. 2 and 4 of lubricant feed conduits 16 and lubricant return conduits 17 relative to the vertical and the horizontal, for example offset by 45 degrees to the vertical and the horizontal through lubricant reservoir 15 prevents taking in of dirt from lubricant reservoir 15 and achieves that only a small amount of lubricant flows out of lubricant return conduits 17 immediately into second lubricant connection 19 and thereby out of lubricant reservoir 15. Vent line 18 that—in the current design example is positioned vertically on 12 o'clock—prevents that air accumulates in the region of axial plain bearing 7.

Shaft seals 14 are advantageously largely or completely airtight so that the lubricant flow cannot be interrupted by intruding air.

A lubricant supply system 33 is thereby created for the plain bearings (in this instance for axial plain bearing 7 and for radial plain bearings 8, 8') that supplies the plain bearings from a lubricant source (here schematically illustrated and identified with 28) via a lubricant supply line with lubricant and removes heated lubricant from the plain bearing via a lubricant discharge line to a lubricant outlet (also schematically illustrated and identified with 34).

The lubricant supply line 30 is formed partially by working medium supply 20 and in the design example illustrated in FIGS. 1 to 4 also by lubricant feed conduits 16, since this connects lubricant source 28 with the plain bearings and all lubricant that flows from lubricant source 28 to the plain bearings must first flow through lubricant reservoir 15. The lubricant discharge line 31 is partially formed by lubricant return conduits 17 in this design example, since these together with lubricant reservoir 15 connect the plain bearings with lubricant outlet 34. Lubricant reservoir 15 is thus positioned in lubricant supply line 30 as well as in lubricant discharge line 31, since all lubricant from lubricant source 28 or respectively working medium supply 20 first flows into lubricant reservoir 15, from there into the plain bearings and out of the plain bearings again into lubricant reservoir 15, before flowing to lubricant outlet 34.

Figure 5:
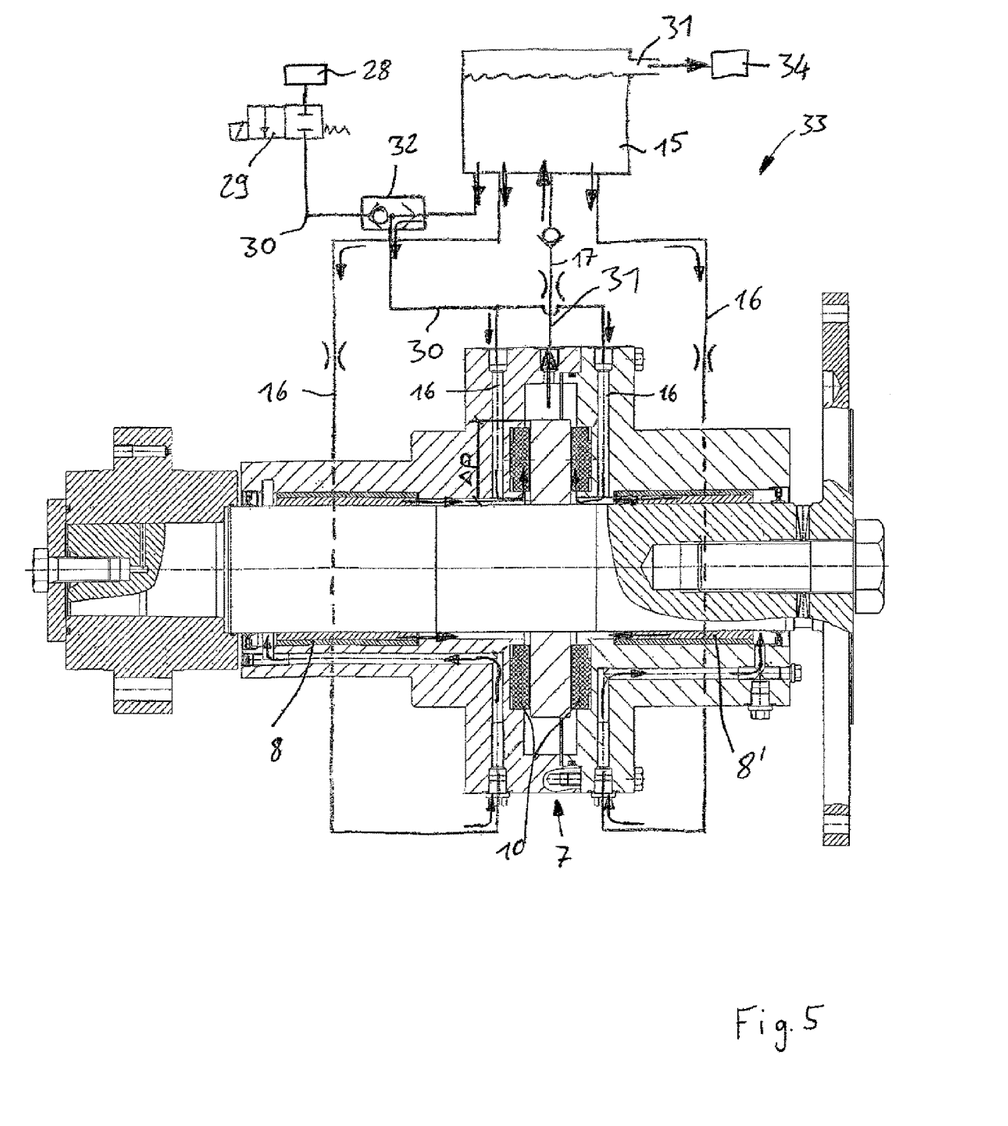
FIG. 5 is an alternative embodiment with a switching valve in the lubricant supply line.

In contrast, in the embodiment illustrated in FIG. 5 lubricant can also flow from lubricant source 28 directly through lubricant supply line 30 into the plain bearings (axial plain bearing 7 and radial plain bearings 8, 8') without first flowing through lubricant reservoir 15, since this is only positioned in lubricant discharge line 31 that is formed partially by the at least one lubricant return conduit 17. The plain bearings are connected via an additional lubricant line with lubricant outlet 34, by bypassing lubricant reservoir 15.

Lubricant reservoir 15 is again connected vial parallel lubricant feed conduits 16 (whereby a single lubricant feed conduit would suffice) and the at least one lubricant return conduit 17 (or several of these) with the plain bearings. By bypassing lubricant reservoir 15, lubricant can thus flow directly from lubricant source 28 to the plain bearings and possibly at the same time via a small circuit out of lubricant reservoir 15. In this sense the connection of lubricant reservoir 15 with the plain bearings represents a lubricant feed conduit 16 as well as also the direct connection of lubricant supply line 30 from lubricant source 28 with the plain bearings.

In the illustrated embodiment a switching valve 32 is provided in lubricant supply line 33 that selectively connects a lubricant feed conduit 16 either with lubricant source 28 or with lubricant reservoir 15, depending on whether lubricant pressure is present at the first connection of switching valve 32 that is connected with lubricant source 28. If no pressure exists, this first connection is closed. If pressure exists, then the second connection to which lubricant reservoir 15 is connected is closed according to one embodiment, whereas another embodiment provides that this second connection remains open so that lubricant from lubricant source 28 can flow through switching valve 32 not only to the plain bearings but also into lubricant reservoir 15.

In the first aforementioned case, switching valve 32 can thus be designed as a dual functioning check valve as illustrated. In the second aforementioned case a simple check valve can suffice.

Also in the embodiment that is illustrated in FIG. 5 and that in particular comprises a lubricant reservoir 15 that is positioned in particular outside the hydrodynamic machine or respectively removed from the housing of the hydrodynamic machine, lubricant supply line 30 could be routed via lubricant reservoir 15, thus saving the connecting piece between switching valve 32 and the plain bearings. In this case switching valve 32 could be equipped with only two connections—if in particular check valve 29 that is illustrated before switching valve 32 is provided—or could be completely omitted whereby then lubricant reservoir 15 would again be integrated into lubricant supply system 33 according to FIGS. 1 to 4.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydrodynamic machine, comprising:
   a bladed primary wheel revolving about an axis of rotation of the hydrodynamic machine;
   a bladed secondary wheel which is stationary or which also revolves about the axis of rotation, said bladed secondary wheel and said bladed primary wheel together forming a toroidal working chamber that is filled or can be filled with a working medium to transmit torque hydro-dynamically via a working medium circuit inside the working chamber from the primary wheel to the secondary wheel, whereby at least one of the primary wheel and the secondary wheel are rotatably mounted using at least one plain bearing;
   a lubricant supply system for the at least one plain bearing, including a lubricant source that is connected via at least one lubricant supply line with the at least one plain bearing, and having a lubricant outlet that is connected via a lubricant discharge line with the at least one plain bearing; and
   a lubricant reservoir provided in at least one of the lubricant supply line and in the lubricant discharge line, the lubricant reservoir adapted for forming a lubricant circuit between the lubricant reservoir and the at least one plain bearing, which is connected via at least one lubricant feed conduit and at least one lubricant return conduit with the at least one plain bearing in the event of failure of the lubricant supply from the lubricant source.

2. The hydrodynamic machine according to claim 1, wherein the lubricant reservoir comprises at least four lubricant connections:
   a first lubricant connection that is connected with the lubricant source;
   a second lubricant connection that is connected with the lubricant outlet;
   a third lubricant connection that is connected with the lubricant feed conduit; and
   a fourth lubricant connection that is connected with the lubricant return conduit.

3. The hydrodynamic machine according to claim 1, wherein at least one of a shut-off valve and a switching valve is provided in the lubricant supply line;
   whereby the switching valve is connected with the lubricant source, the lubricant reservoir, and the plain bearing via three connections; and
   whereby the switching valve includes: a first switching position that connects at least the lubricant source with the at least one plain bearing, and a second switching position that connects the lubricant reservoir with the at least one plain bearing.

4. The hydrodynamic machine according to claim 1, wherein the lubricant is water or a water mixture.

5. The hydrodynamic machine according to claim 2, wherein a first bursting disk is provided in the first lubricant connection, and whereby the first bursting disk is destroyed and thereby supplies the first lubricant connection with lubricant from the lubricant source.

6. The hydrodynamic machine according to claim 2, wherein a second bursting disk is provided in the second lubricant connection; and whereby the second bursting disk is destroyed by lubricant flowing via the first lubricant connection into the lubricant reservoir.

7. The hydrodynamic machine according to claim 2, wherein the lubricant reservoir is in the shape of a cylinder or hollow cylinder or another shape that extends concentrically or eccentrically over the circumference of the axis of rotation of the hydrodynamic machine and that the lubricant connections are distributed over the circumference.

8. The hydrodynamic machine according to claim 7, wherein the central axis of the cylinder coincides with the axis of rotation.

9. The hydrodynamic machine according to claim 7, wherein the first lubricant connection and the second lubricant connection are provided one after another in a circumferential direction of the cylinder or hollow cylinder, with a partition plate arranged between them.

10. The hydrodynamic machine according to claim 2, wherein the first lubricant connection and the second lubricant connection are positioned above the third lubricant connection and the fourth lubricant connection in the lubricant reservoir.

11. The hydrodynamic machine according to claim 2, wherein the fourth lubricant connection is positioned above the third lubricant connection in the lubricant reservoir.

12. The hydrodynamic machine according to claim 2, wherein a multitude of third lubricant connections and/or fourth lubricant connections are provided.

13. The hydrodynamic machine according to claim 1, wherein a multitude of plain bearings are provided, and whereby the various plain bearings are supplied in series by lubricant.

14. The hydrodynamic machine according to claim 13, wherein at least one plain bearing is a thrust plain bearing and at least one plain bearing is a radial plain bearing, and in that the lubricant is fed from at least one of the lubricant source and the lubricant reservoir to the at least one radial plain bearing and to the thrust plain bearing.

15. The hydrodynamic machine according to claim 14, wherein at least one of several thrust plain bearings and several radial plain bearings are provided, with lubricant flowing through them, respectively parallel relative to each other.

16. The hydrodynamic machine according to claim 1, wherein the lubricant is the same as the working medium, whereby it is routed through the plain bearings and the working chamber.

17. The hydrodynamic machine according to claim 1, wherein the lubricant is the same as the working medium, whereby it is routed parallel through the plain bearings and into the working chamber.

18. The hydrodynamic machine according to claim 1, wherein the lubricant reservoir is sealed pressure-tight to protect against the environment.

19. The hydrodynamic machine according to claim 1, wherein the lubricant circuit between the lubricant reservoir and the at least one plain bearing is maintained or respectively created by only the pumping effect of the at least one plain bearing.

20. The hydrodynamic machine according to claim 1, wherein the lubricant reservoir is welded on the face of the hydrodynamic machine, whereby it advantageously surrounds the at least one plain bearing or one or several of a multitude of plain bearings radially from the outside.

* * * * *